(No Model.)  3 Sheets—Sheet 3.
J. F. PACKER.
DISK HARROW.
No. 449,132.  Patented Mar. 31, 1891.
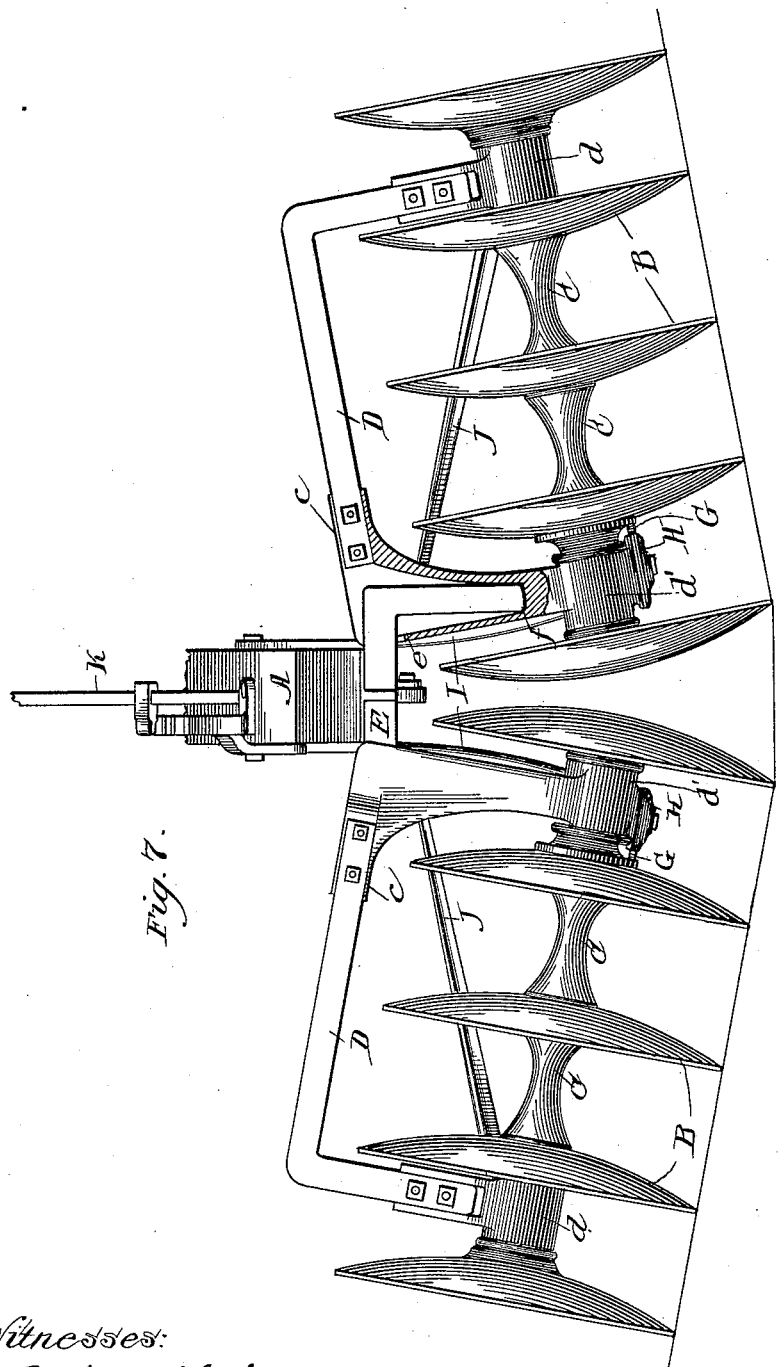
Witnesses:
Albert H. Adams.
Harry T. Jones.
Inventor:
John F. Packer

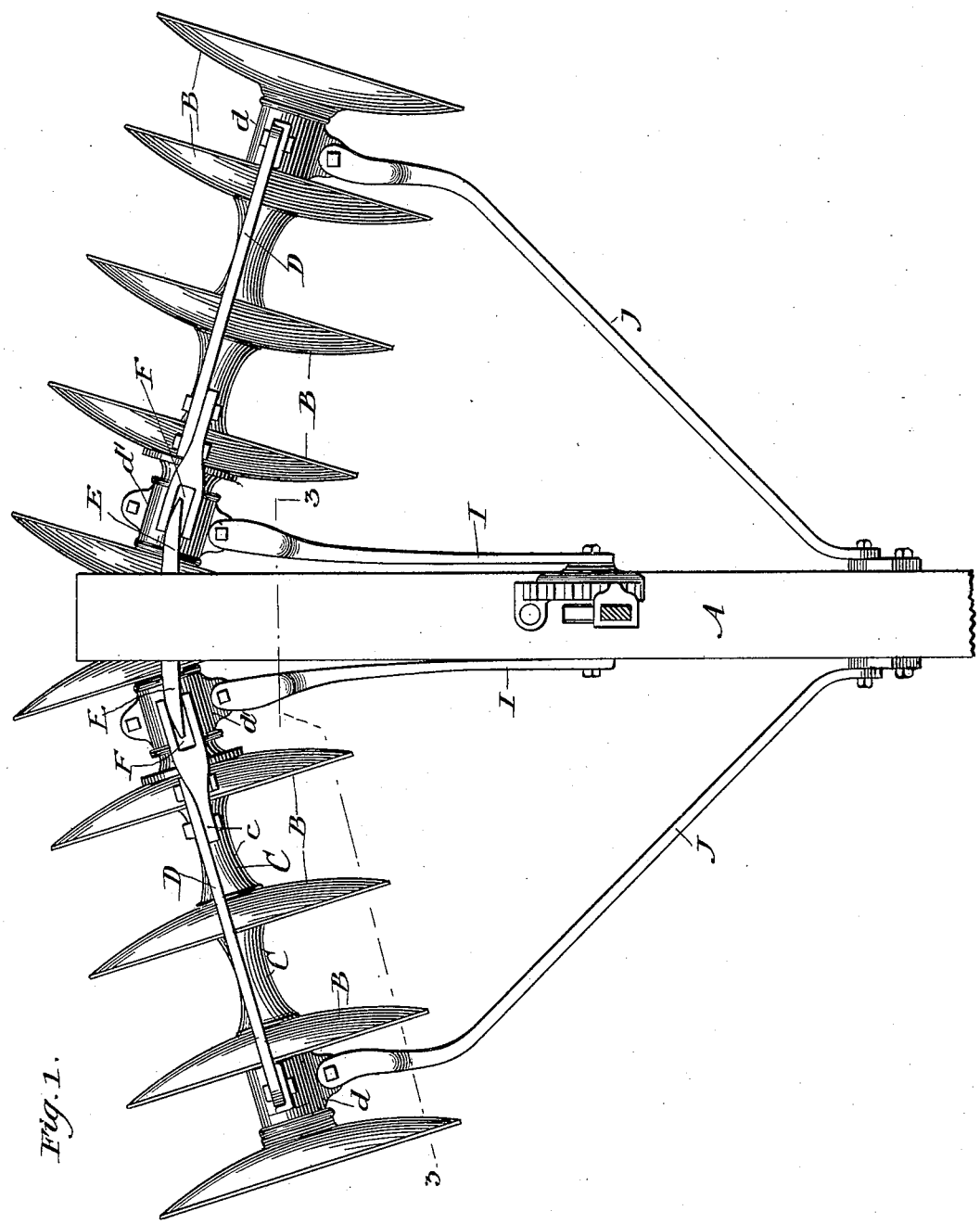

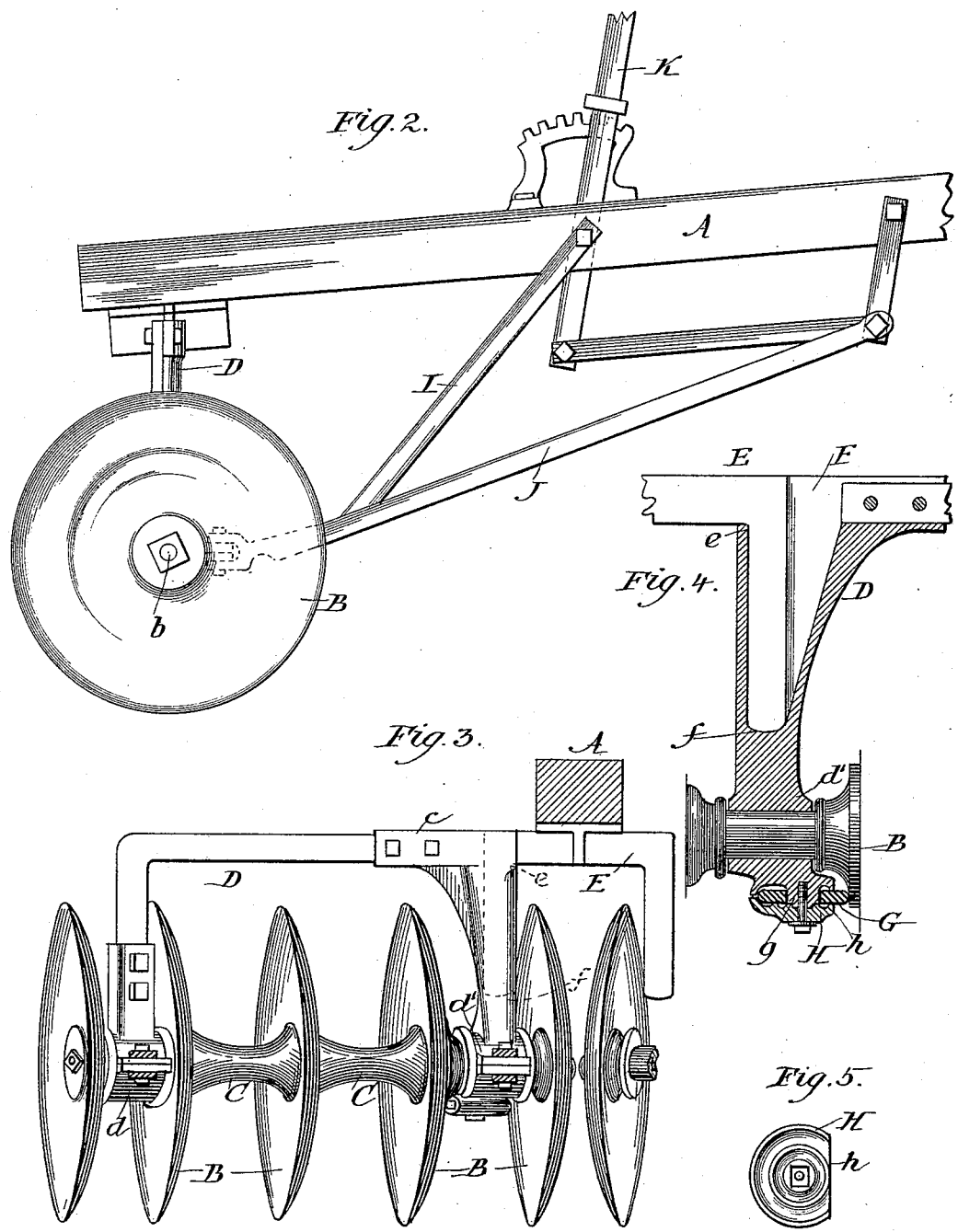

United States Patent Office.

JOHN F. PACKER, OF CHICAGO, ILLINOIS, ASSIGNOR TO THE DAVID BRADLEY MANUFACTURING COMPANY, OF SAME PLACE.

DISK HARROW.

SPECIFICATION forming part of Letters Patent No. 449,132, dated March 31, 1891.

Application filed April 16, 1890. Serial No. 348,266. (No model.)

*To all whom it may concern:*

Be it known that I, JOHN F. PACKER, residing at Chicago, Cook county, Illinois, and a citizen of the United States, have invented a new and useful Improvement in Disk Harrows, of which the following is a specification, reference being had to the accompanying drawings, in which—

Figure 1 is a top or plan view of so much of a disk harrow as is necessary to illustrate my invention. Fig. 2 is a side elevation. Fig. 3 is a section at line 3 3 of Fig. 1. Fig. 4 is a vertical section through one end of one arch and one side of the yoke. Fig. 5 is a detail showing a plate for supporting the anti-friction wheel, and Fig. 6 is a detail showing an anti-friction wheel. Fig. 7 is a rear elevation, a part of one socket being broken away, showing the outer ends of the disk gangs raised.

This invention relates to disk harrows. In harrows of this class there is an end-thrust through the disk gangs, caused by the action of the disks upon the ground, and there is a tendency of the inner ends of the gangs to rise or be lifted off from the ground by the action of the disks at the outer ends of the gangs upon the ground.

The objects of this invention are to provide devices to counteract the end-thrust of the disk gangs and devices to hold the inner ends of adjoining gangs from rising above the horizontal plane of the outer ends, which I accomplish as illustrated in the drawings and as hereinafter described.

That which I claim as new will be pointed out in the claims.

In the drawings, A represents the tongue or draft-pole.

B B represent the disks. These disks are made in the usual form and joined together in gangs, as usual, suitable thimbles C being placed between adjacent disks in the gangs, and a tie-rod $b$ tying the disks and thimbles together.

D D are arches or frames, one for each gang of disks B. These arches or frames are supported upon thimbles or the axles of the disk gangs by suitable bearings $d$. These arches or frames are employed for the purpose of supporting seed-boxes or weight-boxes, and may be dispensed with if no seed-box or weight-box is used.

E is a yoke.

F F are sockets, one for each disk gang. These sockets are supported upon the axles of the disk gangs by suitable bearings $d'$. Each socket F has cast therewith brackets $c$ for attaching the arches or frames D. Each socket F has a bearing $f$, in which bearing $f$ the lower end of one arm of the yoke E closely fits, and each bracket F has a second bearing $e$ to engage with the upper portion of the arm of the yoke in said socket. The opening in each socket F is widened at the top, so that the arm of the yoke may tilt therein when the outer end of the disk gang is raised above the horizontal plane of the inner end, as shown in Fig. 7.

The yoke E holds the inner ends of the adjoining disk gangs apart, so that the inner disks will not interfere with each other, and so that the end-thrust of one gang will counteract the end-thrust of the other gang.

Each arm of the yoke E fits closely in the bearing $f$ in its socket F, and when the gang is in a horizontal plane each socket F will engage with the yoke E at its bearing-point $e$, so that the inner end of either disk gang cannot be raised above its outer end, thereby preventing the inner end of either gang from being lifted from the ground by the action of the disks at the outer end of the gang upon the ground. The position of the yoke E and socket F when the disk gangs are in a horizontal plane is illustrated in Figs. 3 and 4.

The outer ends of the disk gangs can rise to pass over uneven ground as the openings in the sockets F are widened at the top to permit the arms of the yoke to be tilted therein. The tendency of the disk gangs in action, however, is to rise at their inner ends, and the outer ends will not rise, except when necessary to pass over uneven ground. The position shown in Fig. 7 illustrates this, the disk gangs being raised at their outer ends nearly to their limit.

The sockets F, as shown, are located between the inner two disks of each gang, which I have found to be the best arrangement; but it is evident that they may be placed between any of the disks of the gangs.

The endwise thrust of the disk gangs will cause the disk adjoining the socket F to bear against the bearing $d'$ of such socket. To overcome the friction of the disk against the bearing, I place an anti-friction wheel G upon a hub $g$ on the bearing $d'$, so that the anti-friction wheel G will bear against the disk B to reduce the friction. Each wheel G is secured upon the hub $g$ by a plate or disk H, which plates are cut away at $h$, as shown in Figs. 4 and 5, so as not to interfere with the bearing of the wheels G against the disks B.

I I are draft-bars connecting the inner ends of the disk gangs with the draft-pole A.

J J are draft-bars connecting the outer ends of the disk gangs with the draft-pole A.

The angle of the disk gangs may be adjusted as desired by means of a lever K, connected with the draft-bars I J or by any of the common devices for this purpose.

What I claim as new, and desire to secure by Letters Patent, is—

1. In a disk harrow, the combination, with adjoining disk gangs and a socket on each gang, of a yoke whose arms are adapted to enter said sockets and prevent the ends of the gangs from rising, substantially as and for the purpose specified.

2. In a disk harrow, the combination, with adjoining disk gangs, of a socket on each gang, each socket having two bearing-points $e\,f$ and a yoke E, substantially as and for the purpose specified.

3. In a disk harrow, the combination, with adjoining disk gangs and a yoke, of a socket on each gang, each socket having two bearing-points $e\,f$ and having its opening widened at the top, substantially as and for the purpose specified.

4. In a disk harrow, the combination of a yoke with the adjoining disk gangs and a socket on each gang to receive the arms of said yoke and engage therewith on one side and prevent the rising of the ends of the gangs by the action of the disks on the ground and adapted to permit the opposite ends of said gangs to rise, substantially as specified.

JOHN F. PACKER.

Witnesses:
HARRY T. JONES,
ALBERT H. ADAMS.